United States Patent

[11] 3,614,147

| [72] | Inventor | Morris Spector<br>Highland Park, Ill. |
|------|----------|----------------------------------------|
| [21] | Appl. No. | 845,736 |
| [22] | Filed | July 29, 1969 |
| [45] | Patented | Oct. 19, 1971 |
| [73] | Assignee | Sara K. Silverman<br>Miami Beach, Fla. |

[54] SAFETY LOCK FOR TRAILER DOORS
5 Claims, 4 Drawing Figs.

[52] U.S. Cl. .................................................. 292/254,
292/144, 292/341.16, 292/32, 292/65
[51] Int. Cl. ..................................................... E05c 13/04
[50] Field of Search ........................................... 292/341.16,
5, 254, 201, 144; 70/263–265, 277–282, 256

[56] References Cited
UNITED STATES PATENTS

| 2,169,656 | 8/1939 | McNeely | 292/254 |
| 2,466,855 | 4/1949 | Lauver | 292/254 X |
| 3,403,934 | 10/1968 | Butts | 292/341.16 |
| 3,434,751 | 3/1969 | Tantlinger | 292/218 |

*Primary Examiner*—Robert L. Wolfe
*Attorney*—Spector & Alster

ABSTRACT: A freight trailer, or similar freight container; the door of which automatically locks when it is fully shut and is released by a pneumatic motor that receives operating power from a tractor when the trailer is coupled to a tractor. The purpose is to inhibit pilfering from the trailer when it is unattended, as for instance during piggyback rail shipment.

PATENTED OCT 19 1971 3,614,147
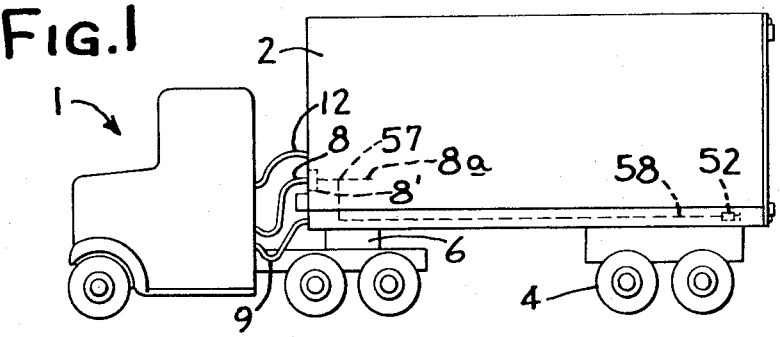
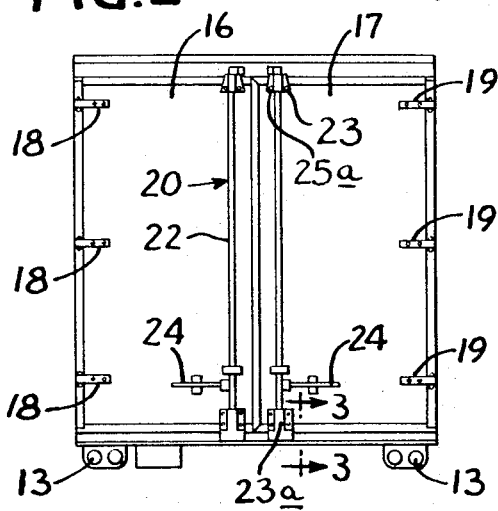
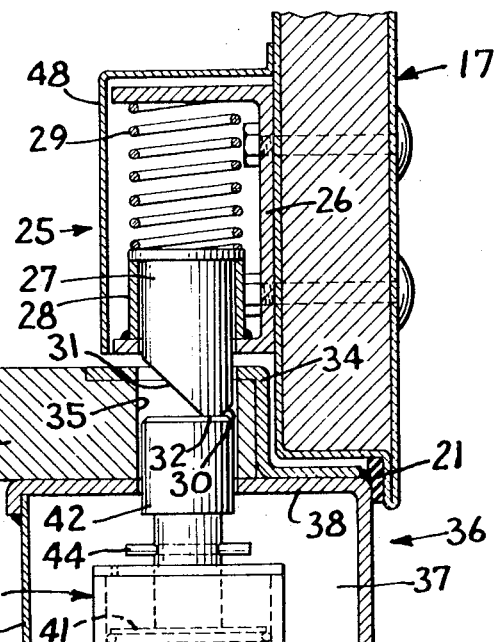
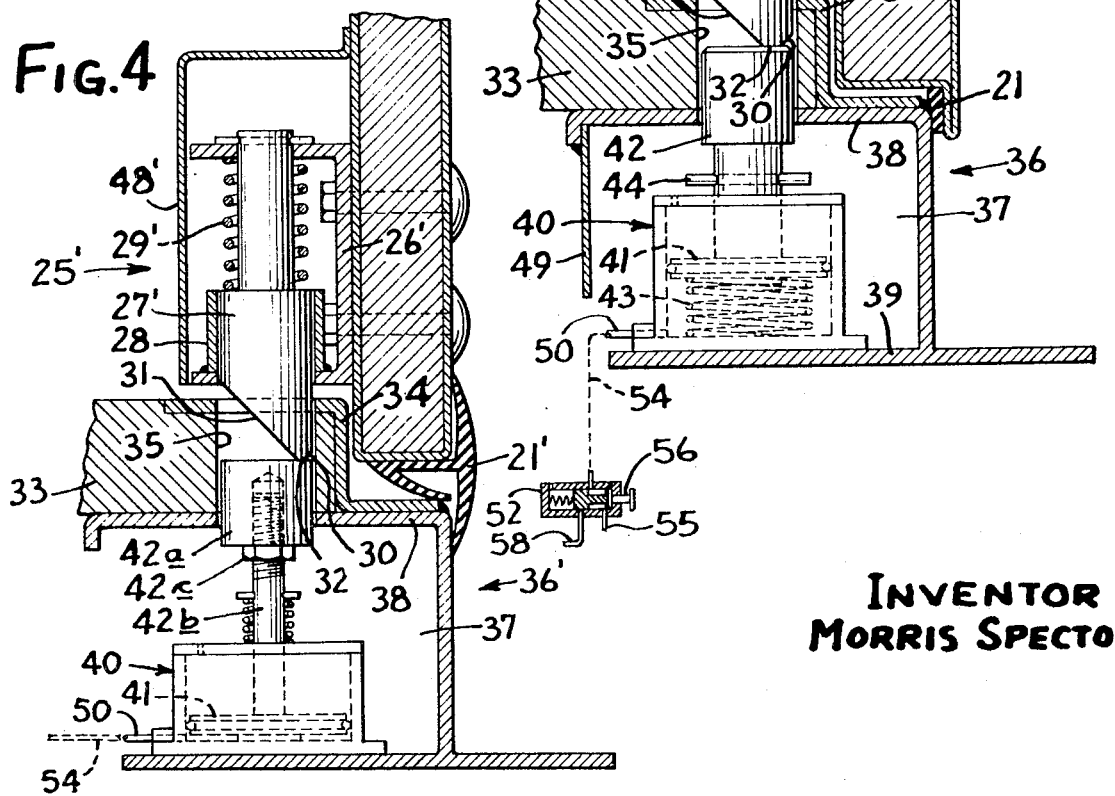
INVENTOR
MORRIS SPECTOR

SAFETY LOCK FOR TRAILER DOORS

This invention relates to apparatus for controlling the opening of the door to a motor trailer, or the like. The word "trailer" is used to include a semitrailer.

Truck trailers are frequently burglarized by entry gained through breaking of the usual door locks. This is particularly true when the trailer itself is or has just been transported on a railroad freight car. A trailer on a freight car is subject to pilfering, and it is also subject to pilfering while it is in the freight yard after removal from the railroad freight car.

A tractor for transporting the trailer provides two sources of auxiliary power for use incidental to the transportation of the trailer. One source of power is air pressure for operating the trailer brakes. The other is electricity for operating the trailer safety signal lighting equipment. It is an object of this invention to provide a simple trailer door locking arrangement that requires for its operation either or both of the two outside sources of power that a trailer normally receives from its tractor when it is coupled thereto. In the preferred embodiment of the invention, power from the outside source is required to move the locking mechanism to its released position, and it cannot be moved to that position in the absence of that power.

It is a further object of the present invention to provide a trailer door with an automatic lock that locks the door when it reaches its fully closed position, and requires action of a power motor for releasing the lock and wherein the entire motor mechanism is located in a position that does not interfere with the loading or unloading of the trailer when the door is open.

Trailer doors are frequently provided with antirack devices to prevent racking of the door during transportation. It sometimes happens that the load in the trailer shifts and exerts a continuous opening force against the door. Later, when an attendant, starting to open the door, releases the door holding cams the pressure of the load on the door slams the door open. The sudden opening swing may result in an accident. It is an object of this invention to minimize this danger.

The attainment of the above and further objects of this invention will be apparent from the following description taken in conjunction with the accompanying drawing forming a part thereof.

In the drawing:

FIG. 1 is a side view of one conventional type of tractor and its trailer to which the present invention is applied;

FIG. 2 is a rear view of the door of the trailer of FIG. 1;

FIG. 3 is an enlarged sectional view taken along the line 3—3 of FIG. 2 and showing the locking mechanism; and FIG. 4 illustrates a modification of FIG. 3.

Reference may now be had particularly to the drawing illustrating a preferred embodiment of the invention.

In the drawing, a conventional six-wheel motor tractor is indicated at 1, to which is coupled a container or semitrailer 2 by means of a conventional coupler 6 that permits coupling and uncoupling of the tractor from the trailer.

The trailer 2 has a four-wheel truck 4 which has a usual pneumatic braking system that is controlled from the cab of the tractor 1 in the usual manner through releasably coupling airhoses 8 and 9, of which 8 is the service line and 9 is the emergency line. These lines lead compressed air through releasable couplings, one of which is shown at 8', to the usual equipment for controlling the application and release of the airbrakes of the wheels of the truck 4. An additional releasable coupling cable 12 provides a multiwire electrical connection between the tractor and the trailer, whereby the electrical system of the tractor applies voltage, in the usual case 12 volts direct current, to the trailer for controlling from the tractor the on and off condition of the usual signal and safety lights such as 13—13 which are the direction and stop lights of the trailer, and the clearance lights.

The rear of the trailer has doors 16–17 that are hinged at 18 and 19, respectively, for swinging about vertical axes in a door frame. The door 16 is closed first and the door 17 which is closed thereafter overlaps the edge of the door 16 and holds that door against opening until the door 17 has been opened.

Each door has a conventional camming arrangement for forcing the door to its fully closed position and latching it in that position, preferably in a manner to prevent racking. This occurs at many times, for instance during humping of a railroad freight car on which the trailer may be carried piggyback. The door latching structure is generally indicated at 20 and includes an axially rotatable vertical bar 22 suitably journaled in upper and lower plates 23 and 23a on the door and having a handle 24 secured thereto and carrying upper and lower cams that cooperate with keepers mounted on the upper and lower portions of the door frame of the trailer. The plates 23 and 23a are secured to the door by round-headed bolts 25a, the heads of which may be welded to the door and the shanks of which extend through the door and receive threaded nuts on the inner side of the door. The latching structure on the door 17 is the same as that on the door 16 except that the cams at the upper and lower ends of the respective bars 22 of the doors are respectively right and left-hand cams. When the door is being closed, the cams at the upper and lower ends of the bars 22 force the respective doors firmly into the door frame of the trailer, compressing peripherally extending moisture excluding yielding gaskets that are secured to the doors, one of which gaskets is shown at 21. This antiracking door latching structure is illustrated more fully in U.S. Pat. No. 3,160,433 that issued Dec. 8, 1964, to which reference may be had for a more complete description.

FIG. 3 shows the rear portion of the floor of a trailer with the trailer door 17 in its closed position. A locking latch 25 includes a channel shaped frame 26 that is secured to the inside of the door. A cylindrical lockbolt 27 is slidable through a hole in the lower flange of the frame 26. The bolt is guided in its vertical movement by a tubular guide 28 secured to the frame 26, and is constantly urged downwardly by a spring 29. The bottom of the bolt has a short conical peripherally extending rounded corner 30 interrupted by a forward flat bevel 31, and terminates in a lower flat surface 32. When the lockbolt 27 is in its lower most position the top of the bevel 31 is slightly above the floor 33 of the trailer. The rear edge of the floor has a reenforcing transverse wear plate 34. A hole 35 is formed through the wear plate and the rest of the floor and through the corresponding support for the rear of the floor. At its rear the floor is supported by a rear steel cross beam the 36 which has a rearwardly facing channel 37 defined by upper and lower flanges 38 and 39.

The locking latch bolt 27 is released by a pneumatic motor assembly 40 which is mounted in the channel 37 on the flange 39. The motor is an air pressure operated piston cylinder arrangement that includes a piston 41 operating in a cylinder, and is connected to a piston rod 42 for releasing the latchbolt 27. A spring 43 biases the piston upwardly. A pin 44 limits the upward movement of the piston rod by engaging the lower surface of the flange 38. The motor 40 receives compressed air for operating it at an air inlet coupling 50. The air inlet coupling 50 is connected by an air line 54 to a manually operable pneumatic switch comprising a valve 52. The valve 52 is spring-biased to its off position illustrated in FIG. 3 where it connects the air line 54 to atmosphere at 55. When the valve 52 is moved to its alternate position by pushing on the knob 56, it connects the line 54 to a pipe 58 that is connected at 57 to the brake air pressure service line 8. The point 57 is between the coupling 8' and the air line 8a that leads to the air service side of the braking system. The trailer coupling 8' is open to atmosphere when the trailer is disconnected from the tractor, so that at that time the line 58 is also at atmospheric pressure.

An explanation will now be given of the operation of the equipment thus far described. The door 16 is first closed and the door 17 is then closed. As the door 17 moves to its fully closed position the surface 31 of the latching bolt 27 rides upwardly on the curved upper end of the wear plate 34, until the flat surface 32 rides on the top of the wear plate. When the doors reach their fully closed positions, and the handles 24 having reached their final positions, the latchbolt 27 is immediately above the hole 35. The bolt 27 drops into the hole under the action of the spring 29. This spring is more powerful than the spring 43. The bolt 27, therefore, forces the piston rod 42 downwardly against the action of the spring 43. The parts will now be in the position illustrated in FIG. 3. The door is now locked shut and cannot be opened until the locking bolt 27 has been retracted.

When the tractor is connected to the trailer and air pressure is applied to the line 58 via the coupling 8' that air pressure does not reach the motor 40 because at that time the valve 52 is in the position illustrated in FIG. 3 so that atmospheric pressure is applied to the coupling 45.

To open the door the operator first releases the handles 24 which permits a very limited turning of the bars 22, thereby placing outward pressure on the doors. The door remains locked by the latchbolt 27 but upon future release of the latchbolt the door moves a very small amount in the opening direction under the resiliency of the door and the parts associated herewith including the resilient sealing gaskets around the periphery of the door to the limits determined by the previous small permissive turning of the bars 22. Thereafter the operator manipulates the valve 52 to apply air pressure to the line 54 and the air inlet coupling 50. This forces the piston rod 42 upwardly, bringing the bottom of the locking bolt 20 to the level of the floor and permitting the door to swing outwardly a small amount limited by the prior limited turning movement of the bars 22. Thereafter the release of the air pressure on the line 54 by release of the valve 52 is of no effect because at that time the flat portion 32 of the locking bolt 20 is resting on the wear plate. The operator then complete the movement of the handles 24 to complete turning of the bars 22 and opening of the doors.

A guard 48 prevents shifting loads within the trailer from interfering with the operation of the device 25.

In order to prevent a pilferer from raising the piston 42 manually, to release the lock, the portion of the structure that carries the motor assembly 40 is enclosed by a guard plate 49 that is welded to the flange 38.

During the normal trucking operation, the valve 52 is in the position illustrated in FIG. 3, which disconnects the air motor 49 from the air system. Changes in air pressure during the braking operation will not cause operation of the piston 41. Also, when the trailer is parked and the brakes are maintained in the on position, the pneumatic locking system cannot possibly gradually bleed air from the braking system and thereby alter the operation of the braking system.

The embodiment of FIG. 4 is similar to that of FIG. 3, and similar reference numerals have been used. Each door here has a somewhat different peripheral sealing gasket 21' of yielding material. Also, here the piston is made of two parts 42a and 42b screw-threaded together for proper length adjustment, and locked in their adjusted position by a locknut 42c.

As previously stated, the valve 52 is manually operable and is located on the trailer in any convenient inconspicuous location accessible to an operator externally of the trailer. Operation of the valve 52 at a time when there is no air pressure on the line of no effect.

If desired, the valve 52 may be located in an inaccessible location and an electromagnetic operator provided for it, in which event an electric pushbutton switch would be placed on the outside of the trailer in a conveniently accessible place, namely for instance the place indicated at 52 in FIG. 1, to actuate the pneumatic valve. Such operation would derive its power via the electric line 12 which receives its electric power from the tractor. It is thus apparent that in such an arrangement in the absence of a tractor the pilferer would require not only air pressure but also a source of 12-volt direct current, neither of which is generally available to the usual pilferer.

The precise constructions herein shown are merely illustrative of the principles of the invention. What is considered new and sought to be claimed and secured by Letters Patent is:

1. A closed compartment for the transportation of freight, said compartment including an opening thru which the container is filled and emptied, a first door for partially closing said opening, a second door for completing the closing, said second door overlapping the first door and preventing the opening thereof while the first door is closed, camming means manually operable from outside of each door for camming each door to its fully closed position and holding it closed, yielding means stressed by each door as it approaches its fully closed position and urging its door in its opening direction as closure of the door is completed, automatic latch means for latching the second door closed as it reaches its fully shut position, whereby upon release of the camming means both doors remain latched closed, a pneumatic motor for releasing the automatic latching means whereby upon actuation of the motor and releasing of the latch after the camming means has been moved from its door fully closed position the second door moves in its opening direction under the action of said yielding means to prevent automatic relatching of the door upon deactuation of the motor, thereby permitting complete opening of the second door, power coupling means on the outside of the compartment for receiving power for the compartment from an external source, and means for conveying power received through said coupling means to said motor, whereby the latch may be released from its locking position only when a power source is coupled to said compartment.

2. A structure as defined in claim 1 having a beam supporting the trailer floor below the door opening, said motor being supported by the beam with all of the motor operated parts located outside of the compartment when the door opening is open, thereby to avoid interference with loading and unloading the compartment.

3. A structure as defined in claim 2 wherein the beam defines a trough within which the motor is located, said trough concealing the motor from outside view.

4. A closed compartment for the transportation of freight, said compartment including an opening thru which the container is filled and emptied, means including a door for closing said opening, camming means manually operable from outside of the door for camming the door to its fully closed position and holding it closed, yielding means stressed by the door as it approaches its fully closed position and urging its door in its opening direction as closure of the door is completed, automatic latch means for latching the door closed as it reaches its fully shut position, whereby upon release of the camming means the door remains latched closed, a pneumatic motor for releasing the automatic latching means whereby upon actuation of the motor and releasing of the latch after the camming means has been moved from its door fully closed position the door moves in its opening direction under the action of said yielding means to prevent automatic relatching of the door upon deactuation of the motor, thereby permitting complete opening of the door, power coupling means on the outside of the compartment for receiving power for the compartment from an external source, and means for conveying power received through said coupling means to said motor, whereby the latch may be released from its locking position only when a power source is coupled to said compartment.

5. A structure as defined in claim 4 having a beam supporting the trailer floor below the door opening, said motor being supported by the beam with all of the motor operated parts located outside of the compartment when the door opening is open, thereby to avoid interference with loading and unloading the compartment.